United States Patent
Harada et al.

(10) Patent No.: US 9,014,395 B2
(45) Date of Patent: Apr. 21, 2015

(54) AUDIO ANALYSIS APPARATUS AND AUDIO ANALYSIS SYSTEM

(75) Inventors: Haruo Harada, Kanagawa (JP); Hirohito Yoneyama, Kanagawa (JP); Kei Shimotani, Kanagawa (JP); Yohei Nishino, Kanagawa (JP); Kiyoshi Iida, Kanagawa (JP); Takao Naito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 459 days.

(21) Appl. No.: 13/412,214

(22) Filed: Mar. 5, 2012

(65) Prior Publication Data
US 2013/0080170 A1    Mar. 28, 2013

(30) Foreign Application Priority Data
Sep. 27, 2011    (JP) .................................. 2011-211479

(51) Int. Cl.
| | | |
|---|---|---|
| H04R 3/00 | (2006.01) | |
| H04R 1/02 | (2006.01) | |
| G10L 17/00 | (2013.01) | |
| G10L 25/51 | (2013.01) | |
| G10L 21/0208 | (2013.01) | |
| G10L 25/87 | (2013.01) | |

(52) U.S. Cl.
CPC ................. G10L 17/00 (2013.01); G10L 25/51 (2013.01); G10L 25/87 (2013.01); G10L 21/0208 (2013.01)

(58) Field of Classification Search
CPC .......... G10L 2021/01265; G10L 2021/02166; G10L 2021/0208; G10L 25/78; G10L 21/0272; G10L 2025/783; H04R 3/005; H04R 2225/43; H04R 2499/11

USPC ............... 381/91, 92, 122, 26, 361, 364, 385, 381/387, 56, 95
See application file for complete search history.

(56) References Cited

U.S. PATENT DOCUMENTS

| | | | | |
|---|---|---|---|---|
| 5,793,875 A | * | 8/1998 | Lehr et al. ..................... 381/313 |
| 2005/0027515 A1 | * | 2/2005 | Huang et al. .................. 704/215 |
| 2011/0255702 A1 | * | 10/2011 | Jensen ............................ 381/66 |
| 2011/0293103 A1 | * | 12/2011 | Park et al. ........................ 381/57 |
| 2013/0024196 A1 | * | 1/2013 | Ganong et al. ................ 704/246 |
| 2013/0166299 A1 | * | 6/2013 | Shimotani et al. ............ 704/246 |
| 2013/0173266 A1 | * | 7/2013 | Nishino et al. ................ 704/236 |

(Continued)

FOREIGN PATENT DOCUMENTS

| | | | |
|---|---|---|---|
| JP | 8-191496 A | | 7/1996 |
| JP | 2006023773 A | * | 1/2006 |

(Continued)

*Primary Examiner* — Xu Mei
(74) *Attorney, Agent, or Firm* — Sughrue Mion, PLLC (57) ABSTRACT

An audio analysis apparatus includes the following components. A main body includes a discrimination unit and a transmission unit. A strap is used for hanging the main body from a user's neck. A first audio acquisition device is provided to the strap or the main body. A second audio acquisition device is provided to the strap at a position where a distance between the second audio acquisition device and the user's mouth is smaller than the distance between the first audio acquisition device and the user's in a state where the strap is worn around the user's neck. The discrimination unit discriminates whether an acquired sound is an uttered voice of the user or of another person by comparing audio signals of the sound acquired by the first and second audio acquisition devices. The transmission unit transmits information including the discrimination result to an external apparatus.

19 Claims, 9 Drawing Sheets

(56) References Cited

U.S. PATENT DOCUMENTS

2013/0272540 A1* 10/2013 hgren et al. ............... 381/94.1
2014/0010397 A1* 1/2014 Merks ......................... 381/330

FOREIGN PATENT DOCUMENTS

| | | |
|---|---|---|
| JP | 2008-72158 A | 3/2008 |
| WO | WO 2006/028587 A2 | 3/2006 |

\* cited by examiner

AUDIO ANALYSIS APPARATUS AND AUDIO ANALYSIS SYSTEM

CROSS-REFERENCE TO RELATED APPLICATIONS

This application is based on and claims priority under 35 USC 119 from Japanese Patent Application No. 2011-211479 filed Sep. 27, 2011.

BACKGROUND (i) Technical Field

The present invention relates to audio analysis apparatuses and audio analysis systems.

SUMMARY

According to an aspect of the invention, there is provided an audio analysis apparatus including a main body, a strap, first and second audio acquisition devices, a discrimination unit, and a transmission unit. The strap is to be connected to the main body and is to be used in order to hang the main body from the neck of a user. The first audio acquisition device is provided to the strap or the main body. The second audio acquisition device is provided to the strap at a position where a distance of a sound wave propagation path between the second audio acquisition device and the mouth of the user is smaller than a distance of a sound wave propagation path between the first audio acquisition device and the mouth of the user in a state where the strap is worn around the neck of the user. The discrimination unit is in the main body, and discriminates whether a sound acquired by the first and second audio acquisition devices is an uttered voice of the user who is wearing the strap around the neck or an uttered voice of another person, on the basis of a result of comparing an audio signal of the sound acquired by the first audio acquisition device with an audio signal of the sound acquired by the second audio acquisition device. The transmission unit is in the main body and transmits to an external apparatus information on the audio signals which includes a discrimination result obtained by the discrimination unit.

BRIEF DESCRIPTION OF THE DRAWINGS

Exemplary embodiment(s) of the present invention will be described in detail based on the following figures, wherein.

DETAILED DESCRIPTION

An exemplary embodiment of the present invention will be described in detail below with reference to the accompanying drawings.

Figure 1:
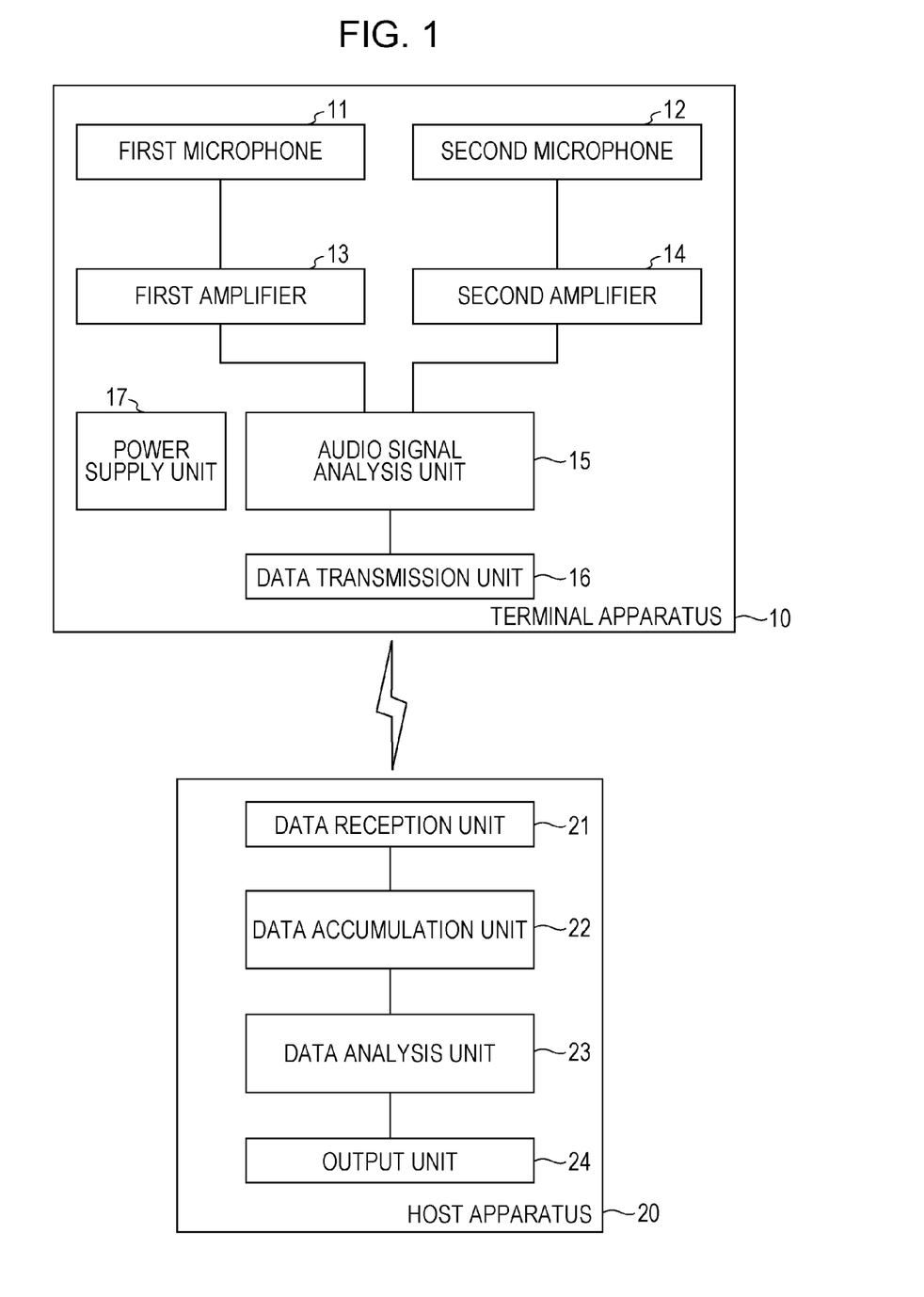
FIG. 1 illustrates an example of a configuration of an audio analysis system according to an exemplary embodiment.

FIG. 1 illustrates an example of a configuration of an audio analysis system according to an exemplary embodiment.

As illustrated in FIG. 1, the audio analysis system according to this exemplary embodiment includes a terminal apparatus 10 and a host apparatus 20. The terminal apparatus 10 is connected to the host apparatus 20 via a wireless communication network. As the wireless communication network, any network based on an existing scheme, such as wireless fidelity (Wi-Fi (trademark)), Bluetooth (trademark), ZigBee (trademark), or ultra wideband (UWB), may be used. Although one terminal apparatus 10 is illustrated in the example, as many terminal apparatuses 10 as the number of users are actually prepared because the terminal apparatus 10 is worn and used by each user, as described in detail later. Hereinafter, a user wearing the terminal apparatus 10 is referred to as a wearer.

The terminal apparatus 10 includes at least a set of microphones (e.g., a first microphone 11 and a second microphone 12) serving as audio acquisition devices, and amplifiers (e.g., a first amplifier 13 and a second amplifier 14). The terminal apparatus 10 also includes, as a processor, an audio signal analysis unit 15 that analyzes recorded audio signals and a data transmission unit 16 that transmits an analysis result to the host apparatus 20. The terminal apparatus 10 further includes a power supply unit 17.

The first microphone 11 and the second microphone 12 are arranged at positions where distances of sound wave propagation paths (hereinafter, simply referred to as "distances") from the mouth (voice emitting portion) of a wearer differ from one another. It is assumed here that the first microphone 11 is arranged at a farther position (e.g., approximately 35 centimeters apart) from the mouth of the wearer, whereas the second microphones 12 is arranged at a nearer position (e.g., approximately 10 centimeters apart) from the mouth of the wearer. Microphones of various existing types, such as dynamic microphones or condenser microphones, may be used as the first microphone 11 and the second microphone 12 in this exemplary embodiment. Particularly, non-directional micro electro mechanical system (MEMS) microphones are desirably used.

The first amplifier 13 and the second amplifier 14 amplify electric signals (audio signals) that are output by the first microphone 11 and the second microphone 12, respectively, in accordance with the acquired sound. Existing operational amplifiers or the like may be used as the first amplifier 13 and the second amplifier 14 in this exemplary embodiment.

The audio signal analysis unit 15 analyzes the audio signals output from the first amplifier 13 and the second amplifier 14. The audio signal analysis unit 15 discriminates whether the sound acquired by the first microphone 11 and the second microphone 12 is a voice uttered by the wearer who is wearing the terminal apparatus 10 or a voice uttered by another person. That is, the audio signal analysis unit 15 functions as a discrimination unit that discriminates a speaker corresponding to the sound on the basis of the sound acquired by the first microphone 11 and the second microphone 12. Concrete content of a speaker discrimination process will be described later.

The data transmission unit 16 transmits the identification (ID) of the terminal apparatus 10 and obtained data including an analysis result obtained by the audio signal analysis unit 15, to the host apparatus 20 via the wireless communication network. Depending on content of the process performed in the host apparatus 20, the information to be transmitted to the host apparatus 20 may include information, such as acquisition times at which a sound is acquired by the first microphone 11 and the second microphone 12 and sound pressures of the acquired sound, in addition to the analysis result. Additionally, the terminal apparatus 10 may include a data accumulation unit that accumulates analysis results obtained by the audio signal analysis unit 15. The data accumulated over a predetermined period may be collectively transmitted. Also, the data may be transmitted via a wired network.

The power supply unit 17 supplies electric power to the first microphone 11, the second microphone 12, the first amplifier 13, the second amplifier 14, the audio signal analysis unit 15, and the data transmission unit 16. As the power supply, an existing power supply, such as a battery or rechargeable battery, may be used. The power supply unit 17 may also include known circuits, such as a voltage conversion circuit and a charge control circuit.

The host apparatus 20 includes a data reception unit 21 that receives data transmitted from the terminal apparatus 10, a data accumulation unit 22 that accumulates the received data, a data analysis unit 23 that analyzes the accumulated data, and an output unit 24 that outputs an analysis result. The host apparatus 20 is implemented by an information processing apparatus, e.g., a personal computer. Additionally, as described above, the plural terminal apparatuses 10 are used in this exemplary embodiment, and the host apparatus 20 receives data from each of the plural terminal apparatuses 10.

The data reception unit 21 is compatible with the wireless communication network. The data reception unit 21 receives data from each terminal apparatus 10, and sends the received data to the data accumulation unit 22. The data accumulation unit 22 is implemented by a storage device, e.g., a magnetic disk device of the personal computer. The data accumulation unit 22 accumulates, for each speaker, the received data acquired from the data reception unit 21. Here, a speaker is identified by comparing the terminal ID transmitted from the terminal apparatus 10 with a terminal ID that is pre-registered in the host apparatus 20 in association with a speaker name. Alternatively, a wearer name may be transmitted from the terminal apparatus 10 instead of the terminal ID.

The data analysis unit 23 is implemented by, for example, a central processing unit (CPU) of the personal computer which is controlled on the basis of programs. The data analysis unit 23 analyzes the data accumulated in the data accumulation unit 22. Various contents and methods of analysis are adoptable as concrete contents and methods of the analysis in accordance with the usage and application of the audio analysis system according to this exemplary embodiment. For example, the frequency of conversions carried out between wearers of the terminal apparatuses 10 and a tendency of a conversation partner of each wearer are analyzed or a relationship between partners of a conversation is estimated from information on durations and sound pressures of utterances made by corresponding speakers in the conversation.

The output unit 24 outputs an analysis result obtained by the data analysis unit 23 and data based on the analysis result. Various output methods, such as displaying with a display, printing with a printer, and outputting a sound, may be adoptable in accordance with the usage and application of the audio analysis system and the content and format of the analysis result.

Figure 2:
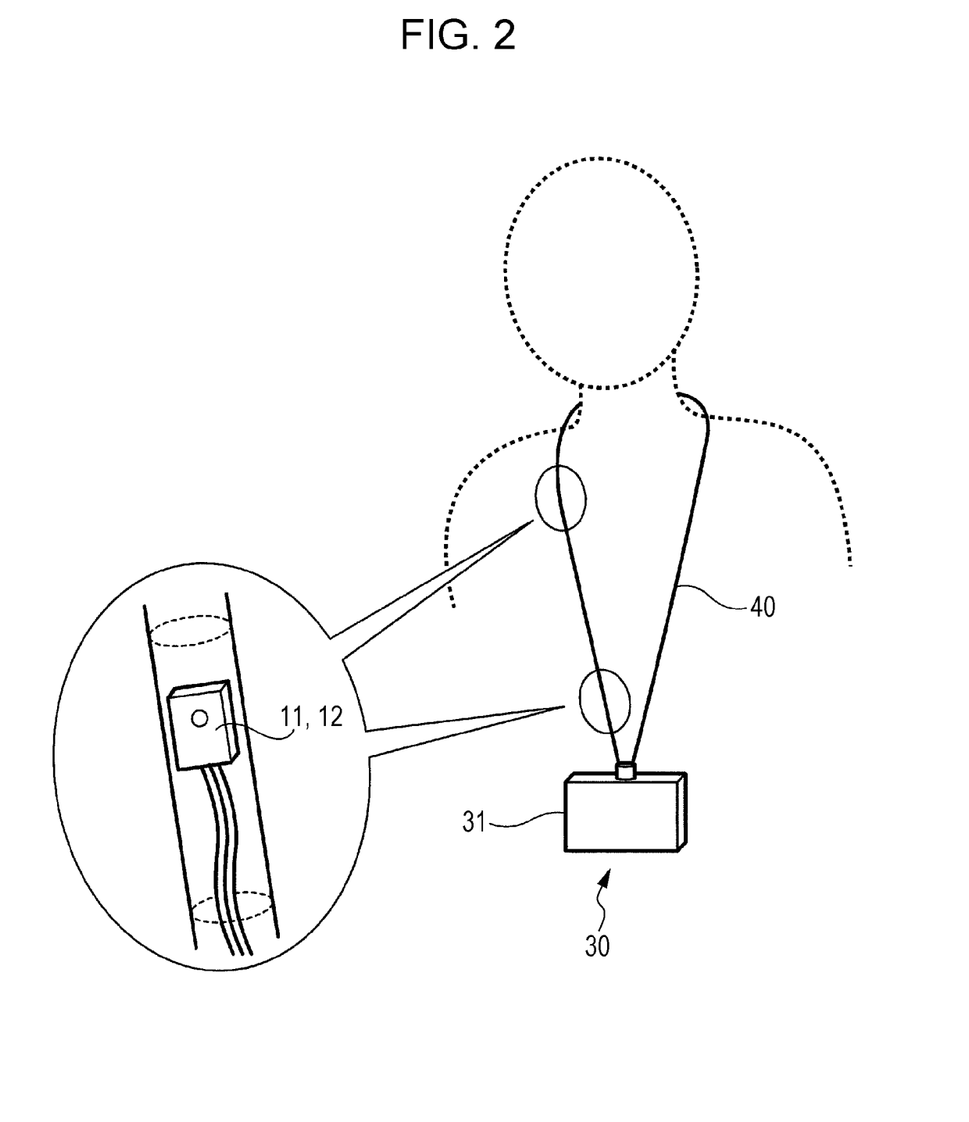
FIG. 2 illustrates an example of a configuration of a terminal apparatus in the exemplary embodiment.

FIG. 2 illustrates an example of a configuration of the terminal apparatus 10.

As described above, the terminal apparatus 10 is worn and used by each user. In order to permit a user to wear the terminal apparatus 10, the terminal apparatus 10 according to this exemplary embodiment includes a main body 30 and a strap 40 that is connected to the main body 30, as illustrated in FIG. 2. In the illustrated configuration, a user wears the strap 40 around their neck to hang the main body 30 from their neck.

The main body 30 includes a thin rectangular parallelepiped casing 31, which is formed of metal, resin, or the like and which contains at least circuits implementing the first amplifier 13, the second amplifier 14, the audio signal analysis unit 15, the data transmission unit 16, and the power supply unit 17, and a power supply (battery) of the power supply unit 17. The casing 31 may have a pocket into which an ID card displaying ID information, such as the name and the section of the wearer, is to be inserted. Additionally, such ID information may be printed on the casing 31 or a sticker having the ID information written thereon may be adhered onto the casing 31.

The strap 40 includes the first microphone 11 and the second microphone 12 (hereinafter, the first and second microphones 11 and 12 are referred to as microphones 11 and 12 when distinction is not needed). The microphones 11 and 12 are connected to the corresponding first and second amplifiers 13 and 14 contained in the main body 30 via cables (wirings or the like) extending inside the strap 40. Various existing materials, such as leather, synthetic leather, natural fibers such as cotton, synthetic fibers made of resins or the like, and metal, may be used as the material of the strap 40. The strap 40 may also be coated with silicone resins, fluorocarbon resins, etc.

The strap 40 has a tubular structure and contains the microphones 11 and 12 therein. By disposing the microphones 11 and 12 inside the strap 40, damages and stains of the microphones 11 and 12 are avoided and conversation participants become less conscious of the presence of the microphones 11 and 12. Meanwhile, the first microphone 11 which is arranged at a farther position from the mouth of a wearer may be disposed in the main body 30, i.e., inside the casing 31. In this exemplary embodiment, however, the description will be given for an example case where the first microphone 11 is disposed in the strap 40.

Referring to FIG. 2, the first microphone 11 is disposed at an end portion of the strap 40 connected to the main body 30 (e.g., at a position within 10 centimeters from a connection part). In this way, the first microphone 11 is arranged at a position that is separate from the mouth of the wearer by approximately 30 to 40 centimeters in a state where the wearer wears the strap 40 around their neck to hang the main body 30 from their neck. When the first microphone 11 is disposed in the main body 30, the distance between the mouth of the wearer and the first microphone 11 is substantially the same.

The second microphone 12 is disposed at a position away from the end portion of the strap 40 connected to the main body 30 (e.g., at a position that is separate from the connection part by approximately 20 to 30 centimeters). In this way, the second microphone 12 is located near the neck of the wearer (e.g., positions of the collarbones) and is arranged at a position that is separate from the mouth of the wearer by approximately 10 to 20 centimeters, in a state where the wearer wears the strap 40 around their neck to hang the main body 30 from their neck.

The configuration of the terminal apparatus 10 according to this exemplary embodiment is not limited to the one illustrated in FIG. 2. For example, a positional relationship between the first microphone 11 and the second microphone 12 is specified so that the distance between the first microphone 11 and the mouth of the wearer is several times as large as the distance between the second microphone 12 and the mouth of the wearer. Accordingly, the first microphone 11 may be disposed in the strap 40 to be located behind the neck. Additionally, the microphones 11 and 12 are not necessarily disposed in the strap 40. The wearer may wear the microphones 11 and 12 using various tools. For example, each of the first microphone 11 and the second microphone 12 may be separately fixed to the clothes with a pin or the like. Additionally, a dedicated wear may be prepared and worn which is designed so that the first microphone 11 and the second microphone 12 are fixed at desired positions.

Additionally, the configuration of the main body 30 is not limited to the one illustrated in FIG. 2 in which the main body 30 is connected to the strap 40 and is hung from the neck of the wearer. The main body 30 is desirably configured as an easy-to-carry apparatus. For example, unlike this exemplary embodiment, the main body 30 may be attached to the clothes or body with clips or belts instead of the strap 40 or may be simply stored in a pocket and carried. Furthermore, a function for receiving audio signals from the microphones 11 and 12, amplifying and analyzing the audio signals may be implemented in existing mobile electronic information terminals, such as mobile phones. When the first microphone 11 is disposed in the main body 30, the position of the main body 30 is specified when being carried because the positional relationship between the first microphone 11 and the second microphone 12 has to be held as described above.

Moreover, the microphones 11 and 12 may be connected to the main body 30 (or the audio signal analysis unit 15) via wireless communication instead of using cables. Although the first amplifier 13, the second amplifier 14, the audio signal analysis unit 15, the data transmission unit 16, and the power supply unit 17 are contained in a single casing 31 in the above configuration example, these units may be configured as plural independent devices. For example, the power supply unit 17 may be removed from the casing 31, and the terminal apparatus 10 may be connected to an external power supply and used.

Speakers (a wearer and another person) are discriminated on the basis nonverbal information of a recorded sound. The speaker discrimination method according to this exemplary embodiment will be described next.

The audio analysis system according to this exemplary embodiment discriminates between an uttered voice of a wearer of the terminal apparatus 10 and an uttered voice of another person, using information of a sound recorded by the two microphones 11 and 12 included in the terminal apparatus 10. That is, in this exemplary embodiment, the wearer or the other person is discriminated regarding a speaker of the recorded voice. Additionally, in this exemplary embodiment, speakers are discriminated on the basis of nonverbal information of the recorded sound, such as sound pressures (sound volumes input to the microphones 11 and 12), instead of verbal information obtained by using morphological analysis and dictionary information. That is, speakers of voices are discriminated on the basis of an utterance state identified from nonverbal information, instead of utterance content identified from verbal information.

As described with reference to FIGS. 1 and 2, the first microphone 11 of the terminal apparatus 10 is arranged at a farther position from the mouth of the wearer, whereas the second microphone 12 is arranged at a nearer position from the mouth of the wearer in this exemplary embodiment. When the mouth of the wearer is assumed as a sound source, the distance between the first microphone 11 and the sound source greatly differs from the distance between the second microphone 12 and the sound source. Specifically, the distance between the first microphone 11 and the sound source is approximately one-and-half to four times as large as the distance between the second microphone 12 and the sound source. Meanwhile, a sound pressure of a sound recorded by the microphone 11 or 12 attenuates (space attenuation) in proportion to the distance between the microphone 11 or 12 and the sound source. Accordingly, regarding an uttered voice of the wearer, a sound pressure of the sound recorded by the first microphone 11 greatly differs from a sound pressure of the sound recorded by the second microphone 12.

On the other hand, when the mouth of a non-wearer (another person) is assumed as a sound source, the distance between the first microphone 11 and the sound source does not greatly differ from the distance between the second microphone 12 and the sound source because the other person is apart from the wearer. Although the distances may differ depending on the position of the other person against the wearer, the distance between the first microphone 11 and the sound source does not become several times as large as the distance between the second microphone 12 and the sound source, unlike the case where the mouth of the wearer is assumed as the sound source. Accordingly, regarding an uttered voice of the other person, the sound pressure of the sound recorded by the first microphone 11 does not greatly differ from the sound pressure of the sound recorded by the second microphone 12, unlike the uttered voice of the wearer.

Figure 3:
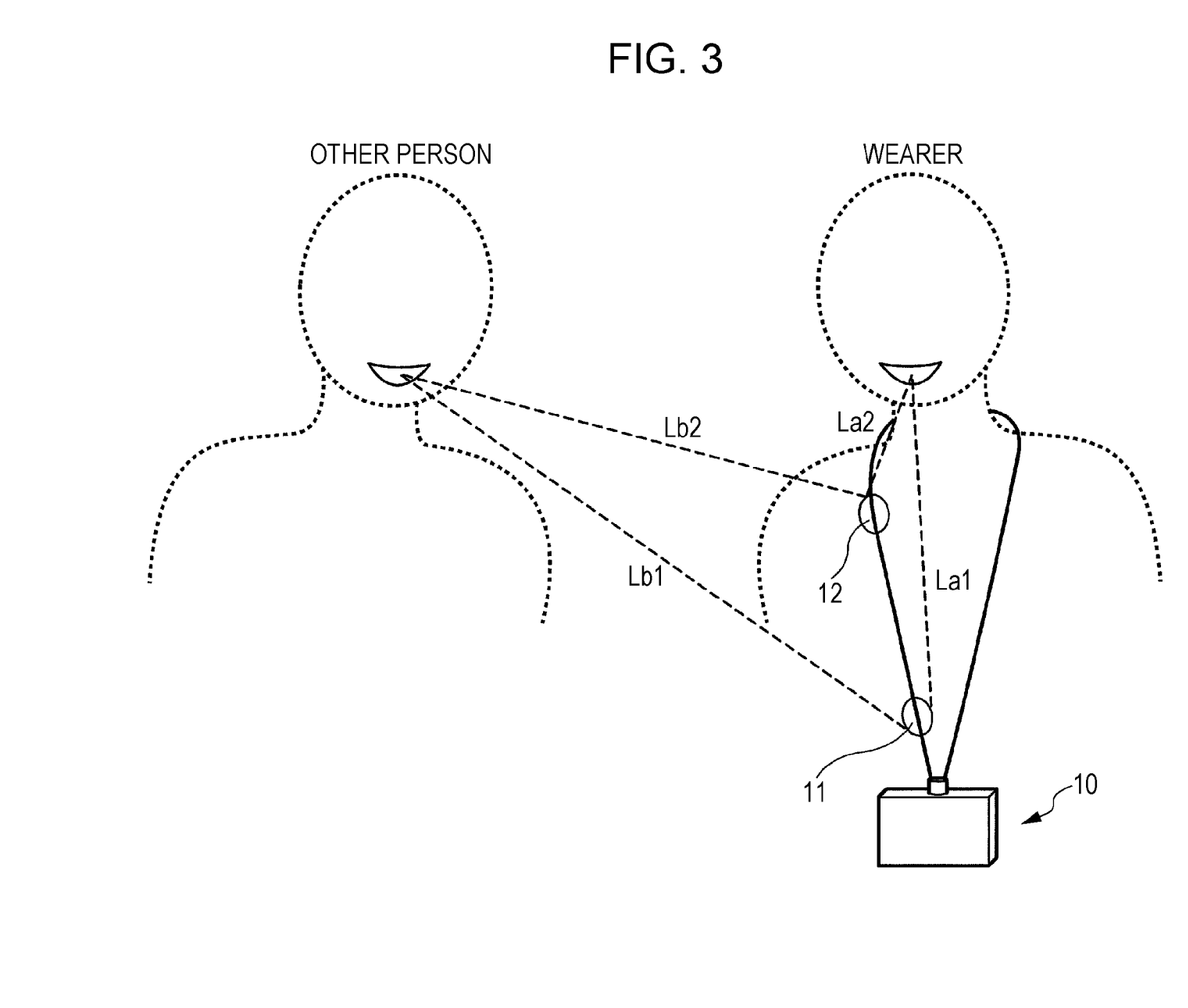
FIG. 3 illustrates positional relationships between microphones and mouths (voice emitting portions) of a wearer and another person.

FIG. 3 illustrates positional relationships between mouths of the wearer and the other person and the microphones 11 and 12.

In the relationships illustrated in FIG. 3, a distance between a sound source "a", i.e., the mouth of the wearer, and the first microphone 11 and a distance between the sound source "a" and the second microphone 12 are denoted as "La1" and "La2", respectively. Additionally, a distance between a sound source "b", i.e., the mouth of the other person, and the first microphone 11 and a distance between the sound source "b" and the second microphone 12 are denoted as "Lb1" and "Lb2", respectively. In this case, the following relations are satisfied.

Figure 4:
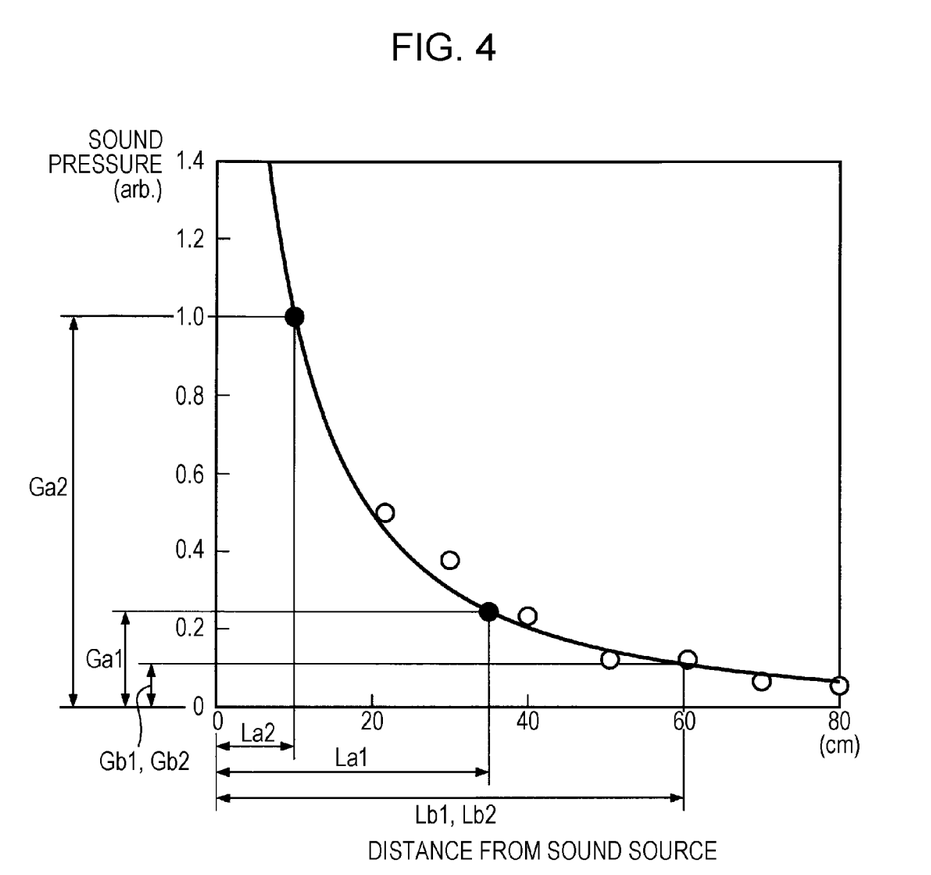
FIG. 4 illustrates a relationship between a sound pressure (input sound volume) and a distance of a sound wave propagation path between a microphone and a sound source.

$La1 > La2 (La1 \approx 1.5 \times La2 \text{ to } 4 \times La2) Lb1 \approx La2$ FIG. 4 illustrates a relationship between a sound pressure (input sound volume) and a distance between the sound source and the microphone 11 or 12.

As described above, sound pressures attenuate depending on the distances between the sound source and the microphones 11 and 12. In FIG. 4, when a sound pressure Ga1 corresponding to the distance La1 is compared with a sound pressure Ga2 corresponding to the distance La2, the sound pressure Ga2 is approximately four times as large as the sound pressure Ga1. On the other hand, a sound pressure Gb1 corresponding to the distance Lb1 is substantially equal to a sound pressure Gb2 corresponding to the distance Lb2 because the distance Lb1 is substantially equal to the distance Lb2. Accordingly, in this exemplary embodiment, an uttered voice of the wearer and an uttered voice of the other person contained in the recorded sound are discriminated by using a difference in the sound pressure ratio. Although the distances Lb1 and Lb2 are set substantially equal to 60 centimeters in the example illustrated in FIG. 4, the distances Lb1 and Lb2 are not limited to the illustrated values since the fact that the sound pressure Gb1 is substantially equal to the sound pressure Gb2 has the meaning.

Figure 5:
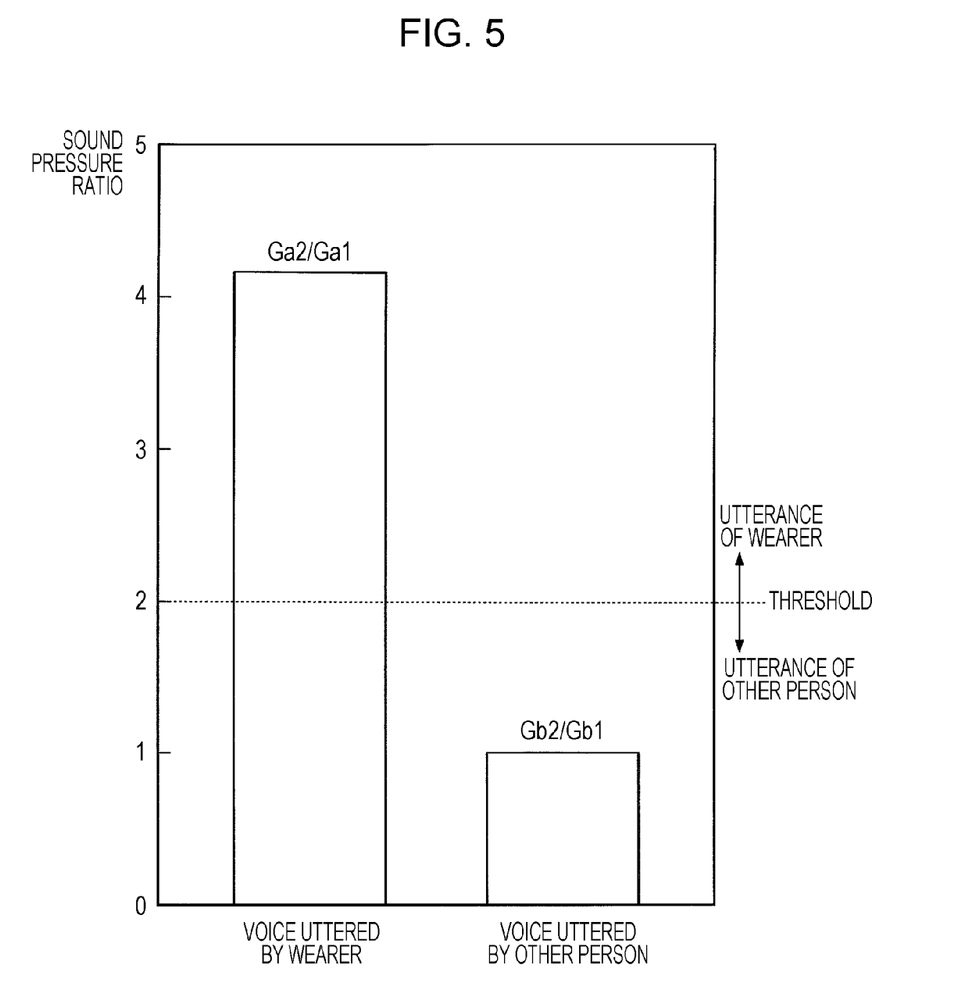
FIG. 5 illustrates a method for discriminating between an uttered voice of a wearer and an uttered voice of another person.

FIG. 5 illustrates a method for discriminating between a voice uttered by the wearer and a voice uttered by the other person.

As described with reference to FIG. 4, regarding the voice uttered by the wearer, the sound pressure Ga2 at the second microphone 12 is several times (e.g., approximately four times) as large as the sound pressure Ga1 at the first microphone 11. Additionally, regarding the voice uttered by the other person, the sound pressure Gb2 at the second microphone 12 is substantially equal to (approximately as large as) the sound pressure Gb1 at the first microphone 11. Accordingly, in this exemplary embodiment, a threshold is set for a ratio of the sound pressure at the second microphone 12 to the sound pressure at the first microphone 11. If the sound pressure ratio is greater than or equal to the threshold, it is determined that the voice is uttered by the wearer. If the sound pressure ratio is smaller than the threshold, it is determined that the voice is uttered by the other person. In the example illustrated in FIG. 5, the threshold is set equal to "2". Since a sound pressure ratio Ga2/Ga1 exceeds the threshold "2", it is determined that the voice is uttered by the wearer. Similarly, since a sound pressure ratio Gb2/Gb1 is smaller than the threshold "2", it is determined that the voice is uttered by the other person.

Meanwhile, a sound recorded by the microphones 11 and 12 includes so-called noise, such as ambient noise, in addition to uttered voices. The relationship of distances between a sound source of the noise and the microphones 11 and 12 resembles that for the voice uttered by the other person. When a distance between a sound source "c" of the noise and the first microphone 11 and a distance between the sound source "c" and the second microphone 12 are denoted as "Lc1" and "Lc2", respectively, the distance "Lc1" is substantially equal to the distance "Lc2" according to the examples illustrated in FIGS. 4 and 5. Accordingly, a sound pressure ratio Gc2/Gc1 in the sound recorded by the microphones 11 and 12 is smaller than the threshold "2". However, such noise is separated from uttered voices by performing filtering processing using existing techniques, such as a band-pass filter and a gain filter.

Figure 6:
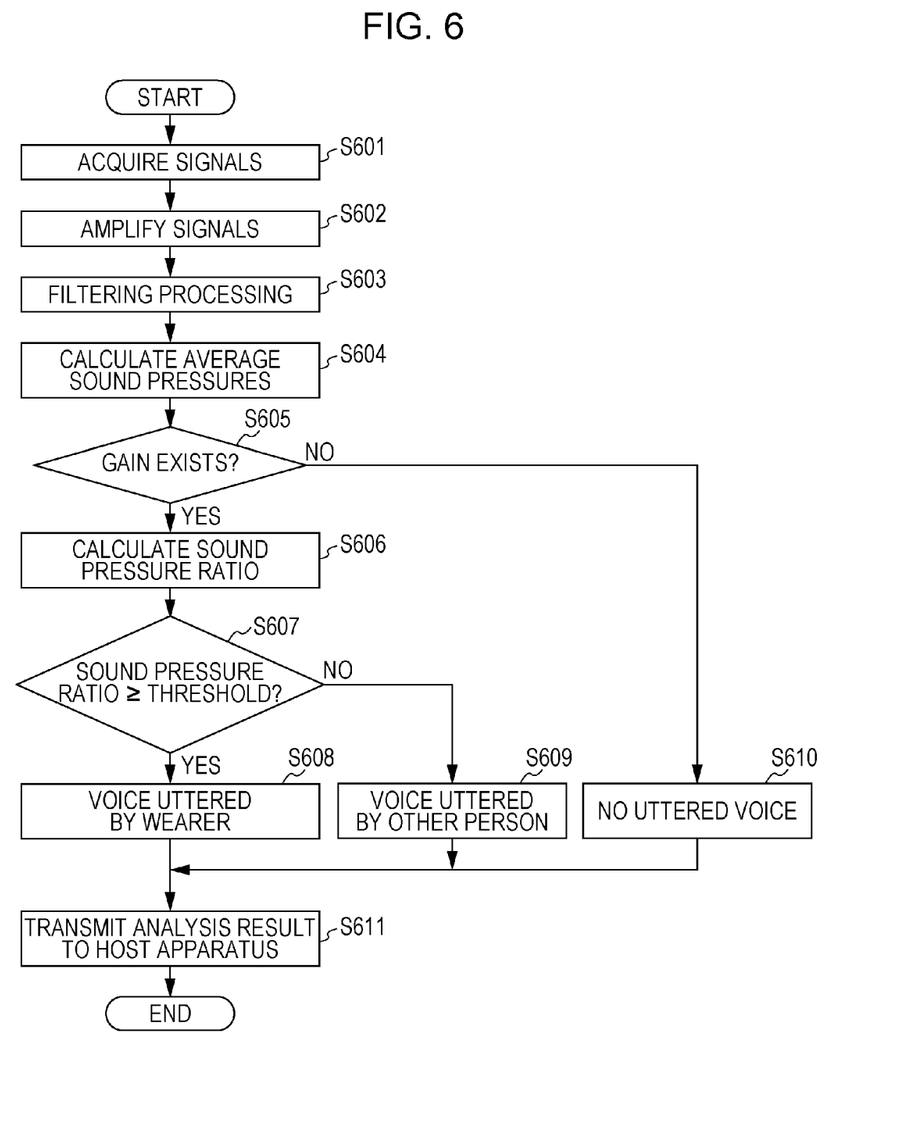
FIG. 6 is a flowchart illustrating an operation of the terminal apparatus in the exemplary embodiment.

FIG. 6 is a flowchart illustrating an operation of the terminal apparatus 10 in this exemplary embodiment.

As illustrated in FIG. 6, once the microphones 11 and 12 of the terminal apparatus 10 acquire a sound, electric signals (audio signals) corresponding to the acquired sound are sent to the first and second amplifiers 13 and 14 from the microphones 11 and 12, respectively (step S601). Upon acquiring the audio signals from the corresponding microphones 11 and 12, the first and second amplifiers 13 and 14 amplify the signals, and send the amplified signals to the audio signal analysis unit 15 (step S602).

The audio signal analysis unit 15 performs filtering processing on the signals amplified by the first and second amplifiers 13 and 14 so as to remove noise components, such as ambient noise, from the signals (step S603). The audio signal analysis unit 15 then determines an average sound pressure of the sound recoded by each of the microphones 11 and 12 at predetermined intervals (e.g., several tenths of a second to several hundredths of a second) from the noise-component removed signal (step S604).

When a gain exists in the average sound pressure at each of the microphones 11 and 12, which has been determined in step S604, (YES in step S605), the audio signal analysis unit 15 determines that an uttered voice is present (utterance is performed), and determines a ratio (sound pressure ratio) of the average sound pressure at the second microphone 12 to the average sound pressure at the first microphone 11 (step S606). If the sound pressure ratio determined in step S606 is greater than or equal to the threshold (YES in step S607), the audio signal analysis unit 15 determines that the voice is uttered by the wearer (step S608). If the sound pressure ratio determined in step S606 is smaller than the threshold (NO in step S607), the audio signal analysis unit 15 determines that the voice is uttered by another person (step S609).

On the other hand, when no gain exists in the average sound pressure at each of the microphones 11 and 12, which has been determined in step S604, (NO in step S605), the audio signal analysis unit 15 determines that an uttered voice is absent (utterance is not performed) (step S610). Meanwhile, it may be determined that the gain exists when the value of the gain of the average sound pressure is greater than or equal to a predetermined value in consideration of a case where noise that has not been removed by the filtering processing performed in step S603 may still remain in the signal.

Subsequently, the audio signal analysis unit 15 transmits, as an analysis result, the information obtained in the processing of steps S604 to S610 (the presence or absence of the utterance and information on the speaker) to the host apparatus 20 via the data transmission unit 16 (step S611). At this time, the duration of an utterance of each speaker (the wearer or the other person), the value of the gain of the average sound pressure, and other additional information may be transmitted to the host apparatus 20 together with the analysis result.

Meanwhile, in this exemplary embodiment, whether a voice is uttered by the wearer or by the other person is determined by comparing the sound pressure at the first microphone 11 with the sound pressure at the second microphone 12. However, the speaker discrimination according to this exemplary embodiment is not limited to the discrimination based on comparison of sound pressures as long as the discrimination is performed on the basis of nonverbal information that is extracted from the audio signals acquired by the microphones 11 and 12. For example, the audio acquisition time (output time of an audio signal) at the first microphone 11 may be compared with the audio acquisition time at the second microphone 12. In this case, a certain degree of difference (time difference) occurs between the audio acquisition times regarding a voice uttered by the wearer since the difference between the distance between the mouth of the wearer and the first microphone 11 and the distance between the mouth of the wearer and the second microphone 12 is large. On the other hand, the time difference between the audio acquisition times of a voice uttered by the other person is smaller than that for the voice uttered by the wearer since the difference between the distance between the mouth of the other person and the first microphone 11 and the distance between the mouth of the other person and the second microphone 12 is small. Accordingly, a threshold may be set for the time difference between the audio acquisition times. If the time difference between the audio acquisition times is greater than or equal to the threshold, it may be determined that the voice is uttered by the wearer. If the time difference between the audio acquisition times is smaller than the threshold, it may be determined that the voice is uttered by the other person.

An application example of the audio analysis system and functions of the host apparatus 20 will be described. In the audio analysis system according to this exemplary embodiment, information on utterances (utterance information) which has been acquired by the plural terminal apparatuses 10 in the above manner is gathered in the host apparatus 20. The host apparatus 20 performs various analysis processes using the information acquired from the plural terminal apparatuses 10, in accordance with the usage and application of the audio analysis system. An example will be described below in which this exemplary embodiment is used as a system for acquiring information regarding communication between plural wearers.

Figure 7:
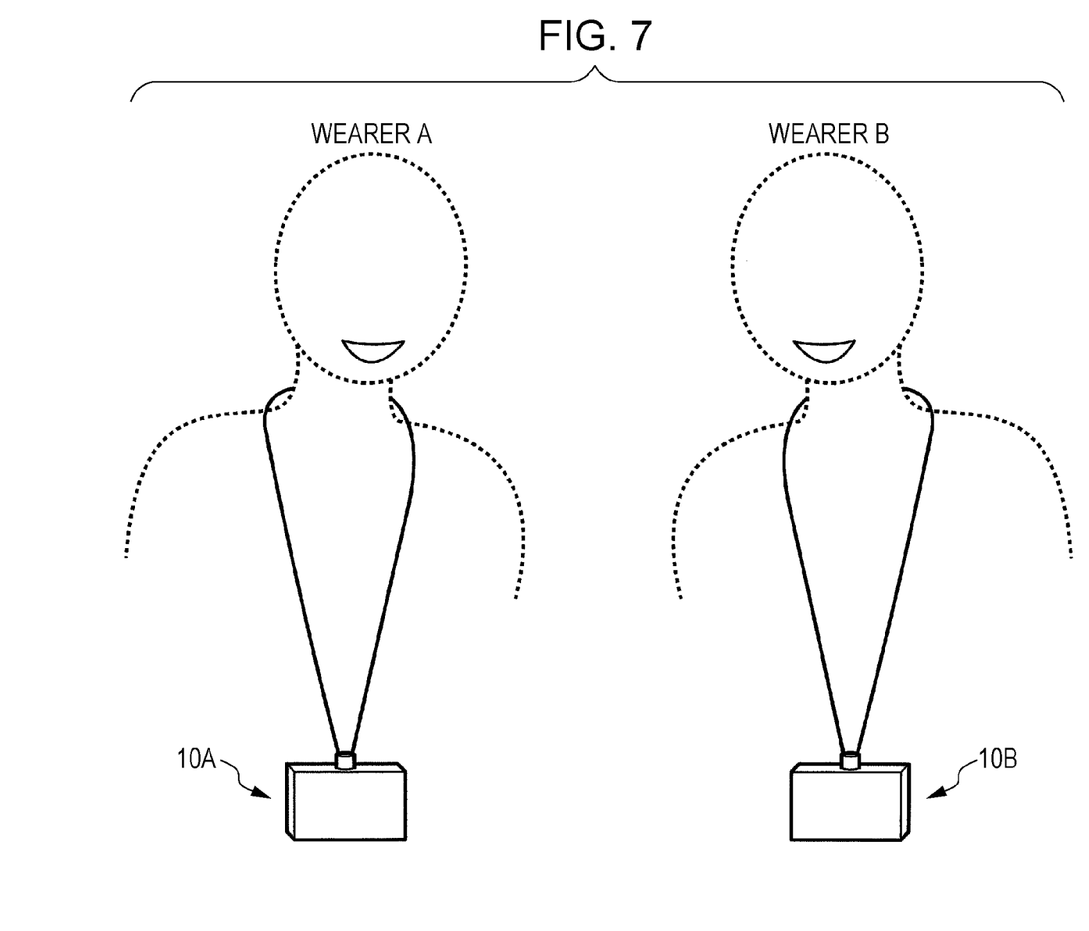
FIG. 7 illustrates a state where plural wearers each wearing the terminal apparatus of the exemplary embodiment are having a conversation.
Figure 8:
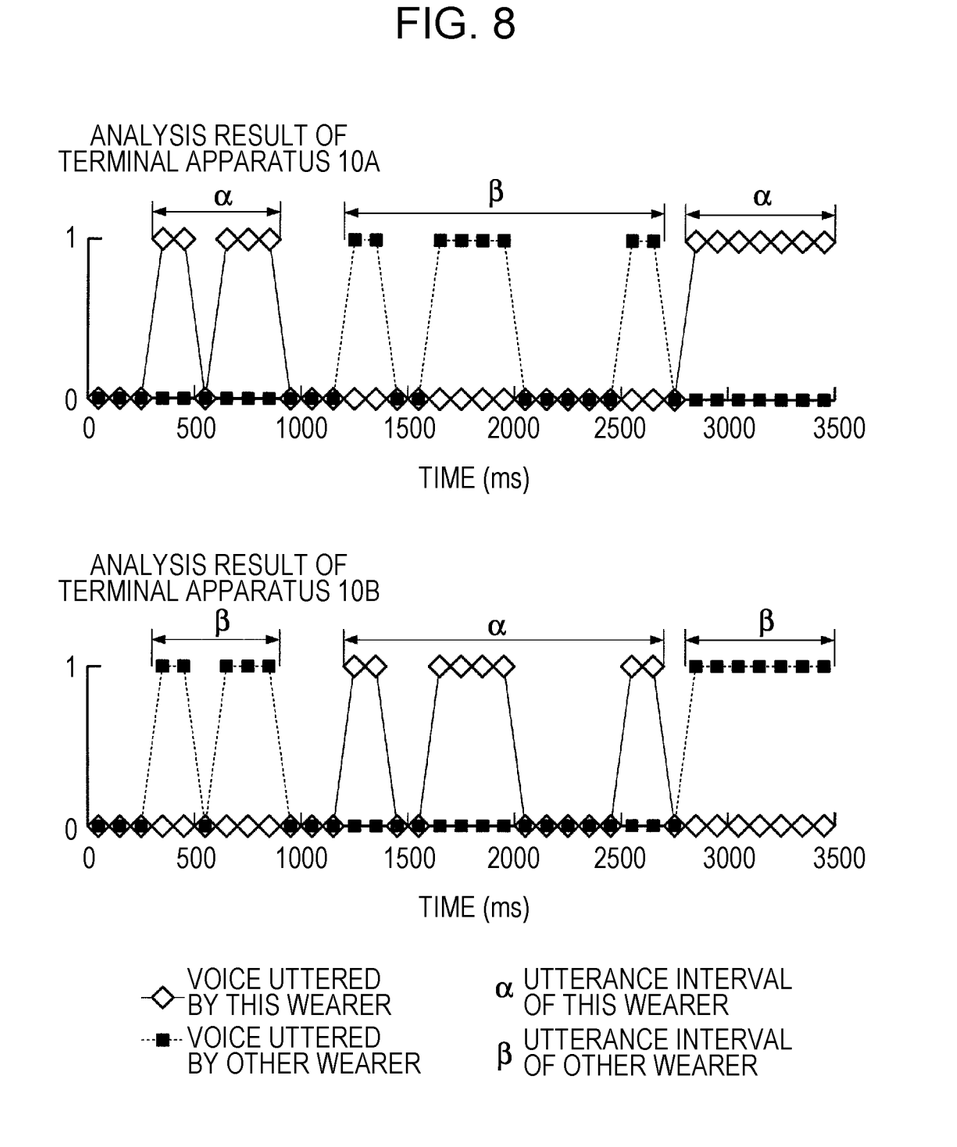
FIG. 8 illustrates an example of utterance information of each terminal apparatus obtained in the state of the conversation illustrated in FIG. 7.

FIG. 7 illustrates a state where plural wearers each wearing the terminal apparatus 10 according to this exemplary embodiment are having a conversation. FIG. 8 illustrates an example of utterance information of each of terminal apparatuses 10A and 10B obtained in the state of the conversation illustrated in FIG. 7.

As illustrated in FIG. 7, a case will be discussed where two wearers A and B each wearing the terminal apparatus 10 are having a conversation. In this case, a voice recognized as an utterance of the wearer by the terminal apparatus 10A of the wearer A is recognized as an utterance of another person by the terminal apparatus 10B of the wearer B. In contrast, a voice recognized as an utterance of the wearer by the terminal apparatus 10B is recognized as an utterance of another person by the terminal apparatus 10A.

The terminal apparatuses 10A and 10B separately transmit utterance information to the host apparatus 20. As illustrated in FIG. 8, the utterance information acquired from the terminal apparatus 10A and the utterance information acquired from the terminal apparatus 10B have opposite speaker (the wearer and the other person) discrimination results but have resembling utterance state information, such as duration of each utterance and timings at which the speaker is switched. Accordingly, the host apparatus 20 in this application example compares the information acquired from the terminal apparatus 10A with the information acquired from the terminal apparatus 10B, thereby determining that these pieces of information indicate the same utterance state and recognizing that the wearers A and B are having a conversation. Here, the utterance state information includes at least utterance-related time information, such as the duration of each utterance of each speaker, the start and end times of each utterance, and the time (timing) at which the speaker is switched. Additionally, part of the utterance-related time information may be used or other information may be additionally used in order to determine the utterance state of a specific conversation.

Figure 9:
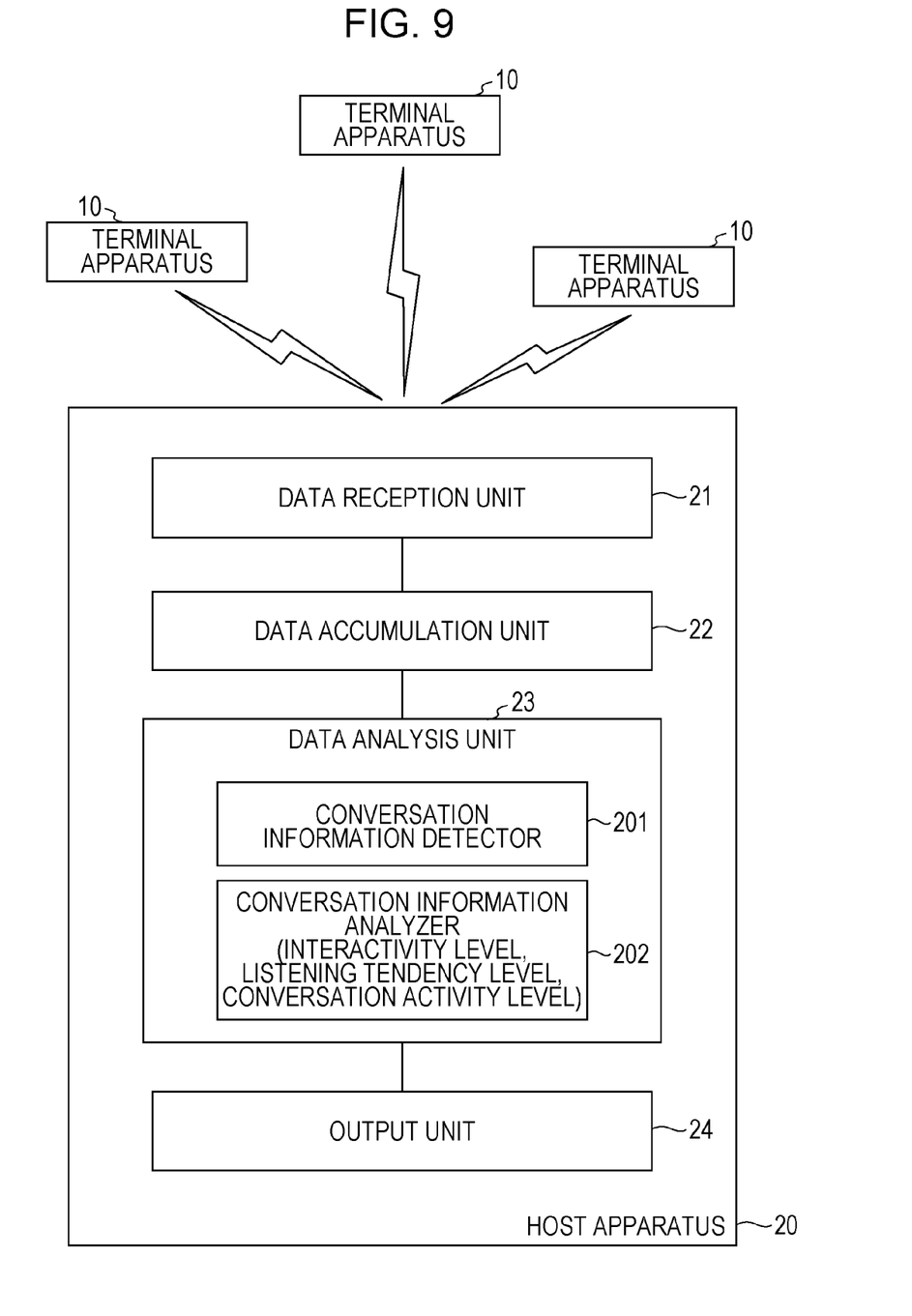
FIG. 9 illustrates an example of a functional configuration of a host apparatus in the exemplary embodiment.

FIG. 9 illustrates an example of a functional configuration of the host apparatus 20 in this application example.

In this application example, the host apparatus 20 includes a conversation information detector 201 that detects utterance information (hereinafter, referred to as conversation information) acquired from the terminal apparatuses 10 of wearers who are having a conversation, from among pieces of utterance information acquired from the terminal apparatuses 10, and a conversation information analyzer 202 that analyzes the detected conversation information. The conversation information detector 201 and the conversation information analyzer 202 are implemented as functions of the data analysis unit 23.

Utterance information is transmitted to the host apparatus 20 also from the terminal apparatuses 10 other than the terminal apparatuses 10A and 10B. The utterance information that has been received by the data reception unit 21 from each terminal apparatus 10 is accumulated in the data accumulation unit 22. The conversation information detector 201 of the data analysis unit 23 then reads out the utterance information of each terminal apparatus 10 accumulated in the data accumulation unit 22, and detects conversation information, which is utterance information regarding a specific conversation.

As illustrated in FIG. 8, a characteristic correspondence different from that of the utterance information of the other terminal apparatuses 10 is extracted from the utterance information of the terminal apparatus 10A and the utterance information of the terminal apparatus 10B. The conversation information detector 201 compares the utterance information that has been acquired from each terminal apparatus 10 and accumulated in the data accumulation unit 22, detects pieces of utterance information having the foregoing correspondence from among the pieces of utterance information acquired from the plural terminal apparatuses 10, and identifies the detected pieces of utterance information as conversation information regarding the same conversation. Since utterance information is transmitted to the host apparatus 20 from the plural terminal apparatuses 10 at any time, the conversation information detector 201, for example, sequentially divides the utterance information into portions of a predetermined period and performs the aforementioned process, thereby determining whether or not conversation information regarding a specific conversation is included.

The condition used by the conversation information detector 201 to detect conversation information regarding a specific conversation from pieces of utterance information of the plural terminal apparatuses 10 is not limited to the aforementioned correspondence illustrated in FIG. 8. The conversation information may be detected using any methods that allow the conversation information detector 201 to identify conversation information regarding a specific conversation from among pieces of utterance information.

Although the example is presented above in which two wearers each wearing the terminal apparatus 10 are having a conversation, the number of conversation participants is not limited to two. When three or more wearers are having a conversation, the terminal apparatus 10 worn by each wearer recognizes a voice uttered by the wearer of this terminal apparatus 10 as an uttered voice of the wearer, and discriminates this voice from voices uttered by the (two or more) other people. However, the utterance state information, such as duration of each utterance and timings at which the speaker is switched, resembles between the pieces of information obtained by the terminal apparatuses 10. Accordingly, as in the aforementioned case for a conversation between two people, the conversation information detector 201 detects utterance information acquired from the terminal apparatuses 10 of the wearers who are participating in the same conversation, and discriminates this information from the utterance information acquired from the terminal apparatuses 10 of the wearers who are not participating in the conversation.

Thereafter, the conversation information analyzer 202 analyzes the conversation information that has been detected by the conversation information detector 201, and extracts features of the conversation. Specifically, in this exemplary embodiment, features of the conversation are extracted using three evaluation criteria, i.e., an interactivity level, a listening tendency level, and a conversation activity level. Here, the interactivity level represents a balance regarding frequencies of utterances of the conversation participants. The listening tendency level represents a degree at which each conversation participant listens to utterances of the other people. The conversation activity level represents a density of utterances in the conversation.

The interactivity level is determined by the number of times the speaker is switched during the conversation and a variance in times spent until a speaker is switch to another speaker (time over which one speaker continuously performs an utterance). This level is obtained on the basis of the number of times the speaker is switched and the time of the switching, from conversation information for a predetermined time. The more the number of times the speaker is switched and the smaller the variance in durations of continuous utterances of the speakers, the greater the value of the interactivity level. This evaluation criterion is common in all conversation information regarding the same conversation (utterance information of each terminal apparatus 10).

The listening tendency level is determined by a ratio between utterance duration of each conversation participant and utterance duration of the other participants in the conversation information. For example, regarding the following equation, it is assumed that the greater the calculated value, the greater the listening tendency level.

Listening tendency level=(Utterance duration of other people)÷(Utterance duration of wearer) This evaluation criterion differs for each utterance information acquired from the corresponding terminal apparatus 10 of each conversation participant even when the conversation information is regarding the same conversation.

The conversation activity level is an index representing livelyness of the conversation, and is determined by a ratio of a silent period (a time during which no conversation participant speaks) to the whole conversation information. The shorter the sum of silent periods, the more frequently any of the conversation participants speaks in the conversation and the greater the value of the conversation activity level. This evaluation criterion is common in all conversation information (utterance information of each terminal apparatus 10) regarding the same conversation.

The conversation information analyzer 202 analyzes the conversation information in the aforementioned manner, thereby extracting features of the conversation from the conversation information. Additionally, the attitude of each participant toward the conversation is also identified from the aforementioned analysis. Meanwhile, the foregoing evaluation criteria are merely examples of information representing the features of the conversation, and evaluation criteria according to the usage and application of the audio analysis system according to this exemplary embodiment may be set by adopting other evaluation items or weighting each evaluation item.

By performing the foregoing analysis on various pieces of conversation information that have been detected by the conversation information detector 201 from among pieces of utterance information accumulated in the data accumulation unit 22, a communication tendency of a group of wearers of the terminal apparatuses 10 may be analyzed. Specifically, for example, by examining a correlation between the frequency of conversations and values, such as the number of conversation participants, duration of a conversation, the interactivity level, and the conversation activity level, the type of conversation that tends to be performed among the group of wearers is determined.

Additionally, by performing the foregoing analysis on pieces of conversation information of a specific wearer, a communication tendency of the wearer may be analyzed. An attitude of a specific wearer toward a conversation may have a certain tendency depending on conditions, such as partners of the conversation and the number of conversation participants. Accordingly, by examining pieces of conversation information of a specific wearer, it is expected that features, such as that the interactivity level is high in a conversation with a specific partner and that the listening tendency level increases in proportion to the number of conversation participants, are detected.

Meanwhile, the utterance information discrimination process and the conversation information analysis process described above merely indicate application examples of the audio analysis system according to this exemplary embodiment, and do not limit the usage and application of the audio analysis system according to this exemplary embodiment, functions of the host apparatus 20, and so forth. A processing function for performing various analysis and examination processes on utterance information acquired with the terminal apparatus 10 according to this exemplary embodiment may be implemented as a function of the host apparatus 20.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An audio analysis apparatus comprising:
   a main body;
   a strap that is to be connected to the main body and is to be used in order to hang the main body from the neck of a user;
   a first audio acquisition device that is provided at least one of at the strap, inside the strap, and inside the main body;
   a second audio acquisition device that is provided at least one of at the strap and inside the strap at a position where a distance of a sound wave propagation path between the second audio acquisition device and the mouth of the user is smaller than a distance of a sound wave propagation path between the first audio acquisition device and the mouth of the user in a state where the strap is worn around the neck of the user;
   a discrimination unit that is in the main body, and configured to discriminate whether a sound acquired by the first and second audio acquisition devices is an uttered voice of the user who is wearing the strap around the neck, configured to discriminate whether the sound acquired by the first and second audio acquisition devices is an uttered voice of another person, on the basis of a result of comparing an audio signal of the sound acquired by the first audio acquisition device with an audio signal of the sound acquired by the second audio acquisition device, and further configured to determine whether the sound acquired by the first and second audio acquisition devices includes noise; and
   a transmission unit that is in the main body and configured to transmit to an external apparatus information on the audio signals which includes a discrimination result obtained by the discrimination unit.

2. The audio analysis apparatus according to claim 1, wherein
   the strap has a tubular structure, and
   at least the second audio acquisition device is disposed inside the strap.

3. The audio analysis apparatus according to claim 1, wherein the discrimination unit is configured to determine whether a speaker corresponding to the sound acquired by the first and second audio acquisition devices is the user or the other person, on the basis of a ratio of a sound pressure of the sound acquired by the second audio acquisition device to a sound pressure of the sound acquired by the first audio acquisition device.

4. The audio analysis apparatus according to claim 2, wherein the discrimination unit is configured to determine whether a speaker corresponding to the sound acquired by the first and second audio acquisition devices is the user or the other person, on the basis of a ratio of a sound pressure of the sound acquired by the second audio acquisition device to a sound pressure of the sound acquired by the first audio acquisition device.

5. The audio analysis apparatus according to claim 1, wherein the discrimination unit determines that an uttered voice is absent if each of first and second average sound pressures, respectively acquired by the first and the second audio acquisition devices, is smaller than a first value.

6. The audio analysis apparatus according to claim 5, wherein the discrimination unit determines whether the acquired sound is an uttered voice of the user or an uttered voice of another person, if each of first and second average sound pressures, respectively acquired by the first and the second audio acquisition devices, is greater than or equal to the first value.

7. The audio analysis apparatus according to claim 1, wherein the first audio acquisition device is arranged at a position that is separate from the mouth of the user by 30 to 40 centimeters, and the second audio acquisition device is arranged at a position that is separate from the mouth of the user by 10 to 20 centimeters.

8. An audio analysis apparatus comprising:
a first audio acquisition device and a second audio acquisition device that are configured to be worn by a user so as to be at positions where distances of sound wave propagation paths from the mouth of the user differ from one another;
a discrimination unit configured to discriminate whether a sound acquired by the first and second audio acquisition devices is an uttered voice of the user who is wearing the first and second audio acquisition devices, configured to discriminate whether the sound acquired by the first and second audio acquisition devices is an uttered voice of another person other than the user, on the basis of a result of comparing an audio signal of the sound acquired by the first audio acquisition device with an audio signal of the sound acquired by the second audio acquisition device, and further configured to determine whether the sound acquired by the first and second audio acquisition devices includes noise; and
a transmission unit configured to transmit to an external apparatus information on the audio signals which includes a discrimination result obtained by the discrimination unit.

9. The audio analysis apparatus according to claim 8, wherein the discrimination unit is configured to determine whether a speaker corresponding to the sound acquired by the first and second audio acquisition devices is the user or the other person, on the basis of a ratio of a sound pressure of the sound acquired by the second audio acquisition device to a sound pressure of the sound acquired by the first audio acquisition device.

10. The audio analysis apparatus according to claim 9, wherein in response to the discrimination unit determining that the acquired sound includes noise, the discrimination unit is configured to compare the sound pressures after performing filtering processing on the audio signals of the sound acquired by the first and second audio acquisition devices to remove the noise from the sound.

11. The audio analysis apparatus according to claim 8, wherein the discrimination unit determines that an uttered voice is absent if each of first and second average sound pressures, respectively acquired by the first and the second audio acquisition devices, is smaller than a first value.

12. The audio analysis apparatus according to claim 11, wherein the discrimination unit determines whether the acquired sound is an uttered voice of the user or an uttered voice of another person, if each of first and second average sound pressures, respectively acquired by the first and the second audio acquisition devices, is greater than or equal to the first value.

13. The audio analysis apparatus according to claim 8, wherein the first audio acquisition device is arranged at a position that is separate from the mouth of the user by 30 to 40 centimeters, and the second audio acquisition device is arranged at a position that is separate from the mouth of the user by 10 to 20 centimeters.

14. An audio analysis system comprising:
a plurality of terminal apparatuses each of which is configured to be worn by a user; and
a host apparatus that is configured to acquire information from each of the plurality of terminal apparatuses,
wherein each of the plurality of terminal apparatuses includes
a first audio acquisition device,
a second audio acquisition device that is at a position where a distance of a sound wave propagation path between the second audio acquisition device and the mouth of the user differs from a distance of a sound wave propagation path between the first audio acquisition device and the mouth of the user,
a discrimination unit configured to discriminate whether a sound acquired by the first and second audio acquisition devices is an uttered voice of the user who is wearing the terminal apparatus, configured to discriminate whether the sound acquired by the first and second audio acquisition devices is an uttered voice of another person, on the basis of a result of comparing an audio signal of the sound acquired by the first audio acquisition device with an audio signal of the sound acquired by the second audio acquisition device, and further configured to determine whether the sound acquired by the first and second audio acquisition devices includes noise, and
a transmission unit configured to transmit to the host apparatus utterance information on the audio signals which includes a discrimination result obtained by the discrimination unit, and
wherein the host apparatus includes
a reception unit configured to receive pieces of the utterance information transmitted from the plurality of terminal apparatuses,
an accumulation unit configured to accumulate the pieces of utterance information received by the reception unit, for each of the plurality of terminal apparatuses that have transmitted the pieces of utterance information,
an analysis unit configured to perform an analysis process on the pieces of utterance information accumulated in the accumulation unit, and
an output unit configured to output an analysis result obtained by the analysis unit.

15. The audio analysis system according to claim 14, wherein in the analysis process, the analysis unit is configured to compare the pieces of utterance information acquired from the plurality of terminal apparatuses with each other, and configured to discriminate pieces of utterance information of users who are participating in a specific conversation on the basis of pieces of time information regarding utterances, the pieces of time information being included in the acquired pieces of the utterance information.

16. The audio analysis system according to claim 14, wherein the discrimination unit is configured to determine whether a speaker corresponding to the sound acquired by the first and second audio acquisition devices is the user or the other person, on the basis of a ratio of a sound pressure of the sound acquired by the second audio acquisition device to a sound pressure of the sound acquired by the first audio acquisition device.

17. The audio analysis system according to claim 14, wherein the discrimination unit determines that an uttered voice is absent if each of first and second average sound pressures, respectively acquired by the first and the second audio acquisition devices, is smaller than a first value.

18. The audio analysis system according to claim 17, wherein the discrimination unit determines whether the acquired sound is an uttered voice of the user or an uttered voice of another person, if each of first and second average sound pressures, respectively acquired by the first and the second audio acquisition devices, is greater than or equal to the first value.

19. The audio analysis system according to claim 14, wherein the first audio acquisition device is arranged at a position that is separate from the mouth of the user by 30 to 40 centimeters, and the second audio acquisition device is arranged at a position that is separate from the mouth of the user by 10 to 20 centimeters.

* * * * *